United States Patent
Hong

(10) Patent No.: US 12,063,640 B2
(45) Date of Patent: Aug. 13, 2024

(54) DATA TRANSMISSION METHOD AND APPARATUS, AND STORAGE MEDIUM

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 475 days.

(21) Appl. No.: 17/316,183

(22) Filed: May 10, 2021

(65) Prior Publication Data
US 2021/0266924 A1 Aug. 26, 2021

Related U.S. Application Data

(63) Continuation of application No. PCT/CN2018/116035, filed on Nov. 16, 2018.

(51) Int. Cl.
*H04W 72/12* (2023.01)
*H04W 16/14* (2009.01)
*H04W 48/10* (2009.01)
*H04W 72/51* (2023.01)

(52) U.S. Cl.
CPC .......... *H04W 72/12* (2013.01); *H04W 16/14* (2013.01); *H04W 48/10* (2013.01); *H04W 72/51* (2023.01)

(58) Field of Classification Search
CPC . H04W 16/14; H04W 72/23; H04W 72/0453; H04W 88/06; H04W 72/0446; H04W 24/10; H04W 84/12; H04W 72/51; H04W 72/02; H04W 88/08; H04W 88/02; H04W 48/18; H04W 8/24; H04W 72/044
See application file for complete search history.

(56) References Cited

U.S. PATENT DOCUMENTS

2018/0069589 A1* 3/2018 Liu ..................... H04L 27/0006
2018/0220338 A1* 8/2018 Tabe ..................... H04W 12/06

FOREIGN PATENT DOCUMENTS

WO    WO 2015127592 A1    9/2015

OTHER PUBLICATIONS

PCT/CN2018/116035 English translation of the International Search Report dated Aug. 14, 2019, 2 pages.

* cited by examiner

*Primary Examiner* — Kwasi Karikari
(74) *Attorney, Agent, or Firm* — Cozen O'Connor

(57) ABSTRACT

A data transmission method and apparatus are provided. The method includes: sending, by a terminal, first capability information to a base station, in which the first capability information is configured to indicate that the terminal has a capability to support an unlicensed frequency band based on cellular mobile communication technology; generating, by the base station, resource scheduling information according to the first capability information, in which the resource scheduling information is configured to schedule resources for data transmission between the terminal and the base station; sending, by the base station, the resource scheduling information to the terminal; performing data transmission on the terminal and the base station on the resources indicated by the resource scheduling information.

16 Claims, 5 Drawing Sheets

DATA TRANSMISSION METHOD AND APPARATUS, AND STORAGE MEDIUM

CROSS-REFERENCE TO RELATED APPLICATION

This application is a continuation application of International Application No. PCT/CN2018/116035, filed on Nov. 16, 2018, the entire contents of which are incorporated herein by reference.

TECHNICAL FIELD

The present disclosure relates to a field of wireless communication technology, and in particular to a data transmission method and apparatus, and a storage medium.

BACKGROUND

In order to cope with the increasing communication demand of mobile data, the industry proposes to extend the application of cellular mobile communication technology to unlicensed frequency bands, so that cellular mobile communication technology can meet the regulatory requirements of unlicensed frequency bands and can be compatible with other unlicensed frequency bands working on the unlicensed frequency band peacefully.

SUMMARY

The present disclosure provides a data transmission method and apparats, and a storage medium. The technical solution is descried as follows.

According to embodiments of the present disclosure, there is provided a data transmission method, the method is executed by a terminal, and the method includes: sending first capability information to a base station, in which the first capability information is configured to indicate that the terminal has a capability to support an unlicensed frequency band based on cellular mobile communication technology; receiving resource scheduling information generated and sent by the base station according to the first capability information, in which the resource scheduling information is configured to schedule resources for data transmission between the terminal and the base station; and performing data transmission with the base station on the resources indicated by the resource scheduling information.

According to embodiments of the present disclosure, a data transmission method is provided, the method is executed by a base station, and the method includes: receiving first capability information sent by a terminal, in which the first capability information is configured to indicate that the terminal has a capability to support an unlicensed frequency band based on cellular mobile communication technology; generating resource scheduling information according to the first capability information, in which the resource scheduling information is configured to schedule resources for data transmission between the terminal and the base station; sending the resource scheduling information to the terminal; performing data transmission with the terminal on the resources indicated by the resource scheduling information.

According to embodiments of the present disclosure, there is provided a data transmission apparatus applied to a terminal, and the apparatus includes: a processor; and a memory configured to store instructions executable by the processor; in which the processor is configured to: send first capability information to a base station, in which the first capability information is configured to indicate that the terminal has a capability to support an unlicensed frequency band based on cellular mobile communication technology; receive resource scheduling information generated and sent by the base station according to the first capability information, in which the resource scheduling information is configured to schedule resources for data transmission between the terminal and the base station; and perform data transmission with the base station on the resources indicated by the resource scheduling information.

According to embodiments of the present disclosure, there is provided a data transmission apparatus applied to a base station, and the apparatus includes: a processor; and a memory configured to store instructions executable by the processor; in which the processor is configured to: receive first capability information sent by a terminal, in which the first capability information is configured to indicate that the terminal has a capability to support an unlicensed frequency band based on cellular mobile communication technology; generate resource scheduling information according to the first capability information, in which the resource scheduling information is configured to schedule resources for data transmission between the terminal and the base station; send the resource scheduling information to the terminal; perform data transmission with the terminal on the resources indicated by the resource scheduling information.

According to embodiments of the present disclosure, a computer-readable storage medium is provided, the computer-readable storage medium contains executable instructions, and a processor in a terminal invokes the executable instructions to implement the data transmission method described in the second aspect or any optional implementation described in the second aspect.

According to embodiments of the present disclosure, a computer-readable storage medium is provided, the computer-readable storage medium contains executable instructions, and a processor in a base station invokes the executable instructions to implement the data transmission method described in the third aspect or any optional implementation described in the third aspect.

It should be noted that, the details above and in the following are exemplary and illustrative, and do not constitute the limitation on the present disclosure.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Figure 1:
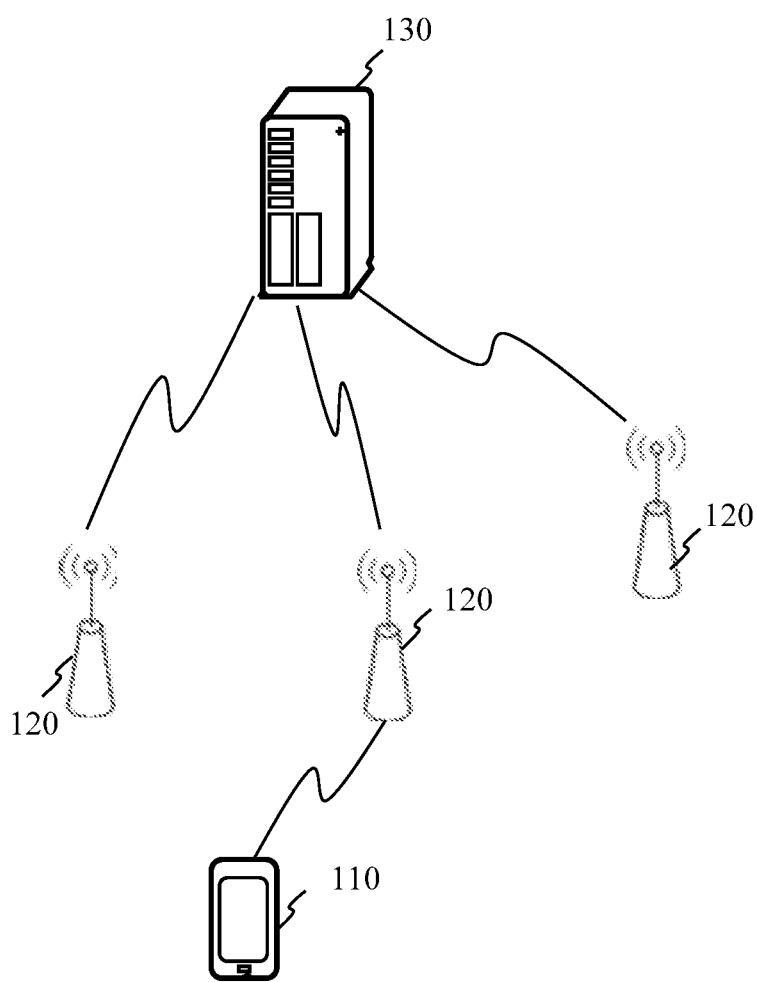
FIG. 1 is a schematic structural diagram showing a wireless communication system according to some exemplary embodiments.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

It should be understood that the "several" mentioned in the present disclosure refers to one or more, and the "a plurality of" refers to two or more. The term "and/or" describes the association relationship of the associated object, indicating that there may be three types of relationships, for example, A and/or B means that: A exists alone, A and B exist at the same time, and B exists alone. The character "/" generally indicates that the associated objects before and after are in an "or" relationship.

In related technologies, regulations in many countries require that wireless access technologies on unlicensed frequency bands follow the Listen Before Talk (LBT) mechanism. If cellular mobile communication technologies want to work normally on unlicensed frequency bands, they also need to follow LBT mechanism. Therefore, a terminal that only supports the unlicensed frequency bands may not be able to directly communicate with a base station that only supports a licensed frequency band, and vice versa.

The technical solutions provided by the embodiments of the present disclosure may include the following beneficial effects.

When the terminal supports the unlicensed frequency band, after accessing the base station, the terminal reports the first capability information to the base station. After the base station receives the first capability information reported by the terminal, it can learn that the terminal has the capability to support the unlicensed frequency band and may perform resources scheduling for the terminal according to the first capability information, so that the base station may know the terminal's capability to support the unlicensed frequency band and then may perform resource scheduling according to the terminal's capability to support the unlicensed frequency band and perform data transmission with the terminal.

The solution of the present disclosure will be described in detail hereafter.

The radio frequency spectrum resource is a limited, non-renewable natural resource. Therefore, various countries have special management organizations for the radio frequency spectrum and issue special policies and regulations to realize the unified planning and management of the radio frequency spectrum. At present, most of the spectrum management in various countries adopt a fixed spectrum allocation strategy, that is, spectrum resources are managed by government authorities and allocated to fixed licensed users, which can ensure that users avoid excessive mutual interference and make better use of spectrum resources. Currently, spectrum resources can be divided into two categories, namely, Licensed Spectrum and Unlicensed Spectrum.

Licensed spectrum is strictly restricted and protected, and only licensed users and their devices that meet the specifications are allowed to access, and users usually have to pay for this. At present, important departments such as public security, railways, civil aviation, radio and television, and telecommunications all have certain licensed spectrum. The communication of equipment in these departments is running on their licensed spectrum, especially in the telecommunications industry. The mobile phones we use every day are operated through the licensed spectrum held by operators. The operators have dedicated frequency bands licensed by radio management units or departments in their respective countries to protect public mobile communications from interference.

Unlicensed spectrum is a spectrum that can be accessed and used by devices that meet certain specifications and standards, but it must be ensured that it does not cause interference to other users. Typically, communication technologies such as Wireless Fidelity (Wi-Fi) and Bluetooth (BT) are transmitted through the unlicensed spectrum. In addition, the Radio-communication Bureau of the International Telecommunications Union once defined the Industrial Scientific Medical (ISM) frequency band, which is mainly open for use by three types of institutions: industry, science, and medicine. No authorization is required. Of course, a certain transmission power is also required, and no interference should be caused to other frequency bands.

With the increasing communication demand for mobile data, the industry has carried out research on extending cellular mobile communication technology to unlicensed frequency bands. For example, in order to extend the fifth-generation mobile communication technology (Fifth-generation, 5G) technology, also known as the new radio (NR) technology to unlicensed frequency bands, the 3rd Generation Partnership Project (3GPP) organized and passed the 5G research project "Study on NR-based Access to Unlicensed Spectrum", which referred to as NR-U, which aims to enable NR to meet the regulation requirements of unlicensed frequency bands through the research of this project, and can guarantee peaceful coexistence with other access technologies working on unlicensed frequency bands. At present, there is no solution in the related technology that can let the terminal and the base station know the NR-U capabilities of each other to make the correct communication choice.

The solution provided by the embodiments of the present disclosure can enable the terminal and the base station to know the other party's capability of supporting the unlicensed frequency band, and then perform data transmission according to the other party's capability of supporting the unlicensed frequency band. For example, in 5G, through the solution provided by the embodiments of the present disclosure, the terminal and the base station can know the NR-U capabilities of the two, and then make a correct communication choice.

The embodiments of the present disclosure provide a data transmission solution, which can be applied to a wireless communication system based on cellular mobile communication technology to implement the terminal to transmit uplink data to the base station.

FIG. 1 is a schematic structural diagram showing a wireless communication system according to some exemplary embodiments. As shown in FIG. 1, the mobile communication system is a communication system based on cellular mobile communication technology, and the mobile communication system may include: several terminals 110 and several base stations 120.

The terminal 110 may be a device that provides voice and/or data connectivity to the user. The terminal 110 may communicate with one or more core networks via a radio access network (RAN). The terminal 110 may be an Internet of Things terminal, such as a sensor device, a mobile phone (or "cellular" phone), and a computer with the Internet of Things terminal, for example, it may be a fixed, portable, pocket-sized, handheld, built-in computer or vehicle-mounted device. For example, Station (STA), subscriber unit, subscriber station, mobile station, mobile, remote station, access point, remote terminal, access terminal, user terminal, user agent, user device, or user equipment (UE). Alternatively, the terminal 110 may also be a device of an unmanned aerial vehicle.

The base station 120 may be a network side device in a wireless communication system. The wireless communication system may be the 4th generation mobile communication (4G) system, also known as the Long-Term Evolution (LTE) system; or, the wireless communication system may also be a 5G system, also known as the new radio (NR) system. Alternatively, the wireless communication system may also be the next-generation system of the 5G system.

The base station 120 may be an evolved base station (eNB) used in a 4G system. Alternatively, the base station 120 may also be a base station (gNB) adopting a centralized and distributed architecture in the 5G system. When the base station 120 adopts a centralized and distributed architecture, it usually includes a centralized unit (CU) and at least two distributed units (DU). The centralized unit is provided with protocol stacks of a packet data convergence protocol (PDCP) layer, a radio link layer control protocol (RLC) layer, and a media access control (MAC) layer. A distribution unit is provided with a physical (PHY) layer protocol stack, and the embodiment of the present disclosure does not limit the specific implementation manner of the base station 120.

A wireless connection can be established between the base station 120 and the terminal 110 through a wireless air interface. In different embodiments, the wireless air interface is a wireless air interface based on the fourth-generation mobile communication network technology (4G) standard; or, the wireless air interface is a wireless air interface based on the fifth-generation mobile communication network technology (5G) standard, for example, the wireless air interface is a new radio (NR); or, the wireless air interface may also be a wireless air interface based on next-generation mobile communication network technology standards based on 5G.

Optionally, the foregoing wireless communication system may further include a network management device 130.

Several base stations 120 are connected to the network management device 130 respectively. The network management device 130 may be a core network device in a wireless communication system. For example, the network management device 130 may be a mobility management entity (MME) in an Evolved Packet Core (EPC) network. Alternatively, the network management device may also be other core network devices, such as Serving GateWay (SGW), Public Data Network GateWay (PGW), Policy and Charging Rules Function (PCRF) or Home Subscriber Server (HSS), etc. The implementation form of the network management device 130 is not limited in the embodiments of the present disclosure.

During data transmission between the terminal and the base station, the terminal can report its capability of supporting the unlicensed spectrum to the base station, so that the base station can schedule the data transmission between the terminal and the base station according to the terminal's support capability of the licensed spectrum.

Figure 2:
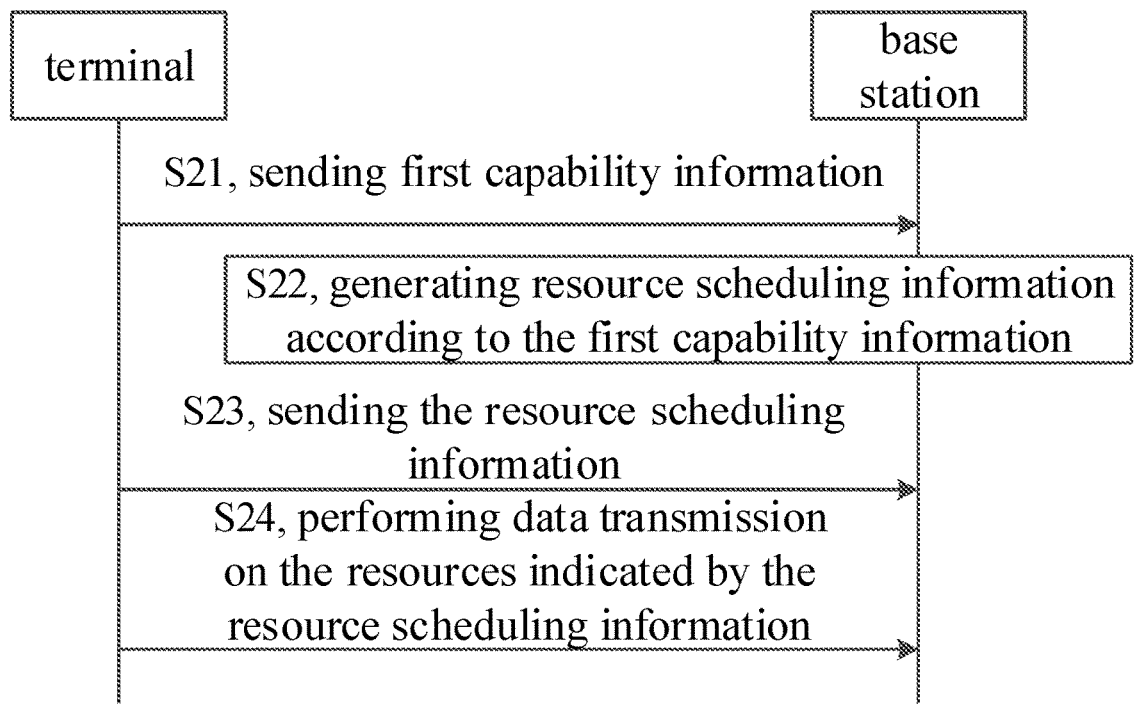
FIG. 2 is a schematic diagram showing a flow of data transmission according to an exemplary embodiment.

For example, please refer to FIG. 2, which is a schematic diagram showing a flow of data transmission according to an exemplary embodiment. As shown in FIG. 2, the data transmission process between the terminal and the base station may be as follows.

In step S21, the terminal sends first capability information to a base station, in which the first capability information is configured to indicate that the terminal has a capability to support an unlicensed frequency band based on cellular mobile communication technology; the base station receives the first capability information.

The above-mentioned capability to support unlicensed frequency bands based on cellular mobile communication technology includes but is not limited to at least one of: the capability to transmit data on unlicensed frequency bands based on cellular mobile communication technology, and the capability to access network on unlicensed frequency bands based on cellular mobile communication technology.

After accessing the base station based on the cellular mobile communication technology, the terminal establishes a wireless communication connection with the base station, and sends the first capability information to the base station through the established wireless communication connection.

Optionally, the first capability information may include an indication identifier configured to indicate that the terminal has the capability of supporting an unlicensed frequency band based on cellular mobile communication technology.

Optionally, the first capability information may also include a frequency band indication, and the frequency band indication is configured to indicate which frequency bands in the unlicensed frequency bands are supported by the terminal. For example, assuming that the unlicensed frequency bands have 5 GHz frequency bands, 37 GHz frequency bands, and 60 GHz frequency bands, the frequency band indication in the first capability information sent by the terminal may indicate which of the above unlicensed frequency bands the terminal supports based on cellular mobile communication technology.

In step S22, the base station generates resource scheduling information according to the first capability information, in which the resource scheduling information is configured to schedule resources for data transmission between the terminal and the base station.

In the embodiments of the present disclosure, if the base station also supports unlicensed frequency bands, when the base station performs resource scheduling on the terminal, it can allocate transmission resources in the unlicensed frequency band for the data to be transmitted corresponding to the terminal, and generate resource scheduling information based on the allocated transmission resources information.

In step S23, the base station sends the resource scheduling information to the terminal; the terminal receives the resource scheduling information.

For example, the base station may send the resource scheduling information to the terminal through a Physical Downlink Control Channel (PDCCH).

In step S24, the terminal and the base station perform data transmission on the resources indicated by the resource scheduling information.

In the embodiment of the present disclosure, when the terminal supports the unlicensed frequency band, after accessing the base station, the terminal reports the first capability information to the base station. After the base station receives the first capability information reported by the terminal, it can learn that the terminal has the capability to support the unlicensed frequency band and may perform resources scheduling for the terminal according to the first capability information, so that the base station may know the terminal's capability to support the unlicensed frequency band and then may perform resource scheduling according to the terminal's capability to support the unlicensed frequency band and perform data transmission with the terminal.

Figure 3:
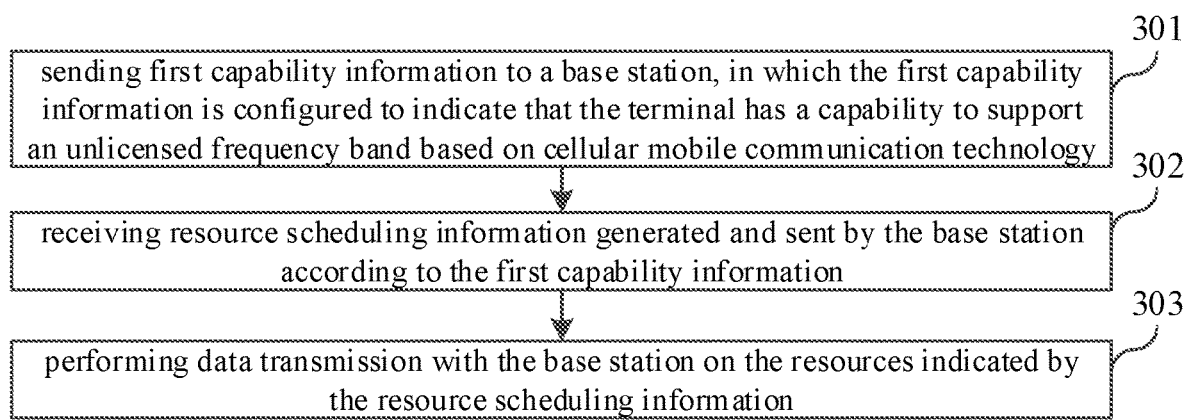
FIG. 3 is a flowchart showing a data transmission method according to an exemplary embodiment.

FIG. 3 is a flowchart showing a data transmission method according to an exemplary embodiment. As shown in FIG. 3, the data transmission method is applied to the wireless communication system shown in FIG. 1, and is executed by the terminal 110 in FIG. 1. The method may include the following steps.

In step 301, first capability information is sent to a base station, in which the first capability information is configured to indicate that the terminal has a capability to support an unlicensed frequency band based on cellular mobile communication technology.

In step 302, resource scheduling information generated and sent by the base station according to the first capability information is received, in which the resource scheduling information is configured to schedule resources for data transmission between the terminal and the base station.

In step 303, data transmission is performed with the base station on the resources indicated by the resource scheduling information.

Optionally, before the sending the first capability information to the base station, the method further includes: acquiring base station capability information of the base station, in which the base station capability information is configured to indicate whether the base station has a capability to support an unlicensed frequency band based on the cellular mobile communication technology; accessing the base station in response to the base station capability information indicating that the base station has the capability to support the unlicensed frequency band based on the cellular mobile communication technology.

Optionally, acquiring base station capability information of the base station may include: receiving base station capability information sent by the base station in a broadcast manner; or, acquiring base station capability information stored locally, in which the base station capability information is sent by the base station through a unicast radio resource control (RRC) signaling in response to the terminal previously accessing the base station.

Optionally, receiving base station capability information sent by the base station in the broadcast manner may include: receiving a system message broadcasted by the base station; acquiring the base station capability information carried in a master information block (MIB) or a system information block (SIB) in the system message.

Optionally, the method further includes: receiving base station capability information sent by the base station, in which the base station capability information is configured to indicate whether the base station has a capability to support an unlicensed frequency band based on the cellular mobile communication technology; and storing the base station capability information.

Optionally, the method further includes: sending second capability information to the base station, in which the second capability information is configured to indicate that the terminal has a capability to support a designated access manner, and the specified access manner is a network access manner based on an unlicensed frequency band; receiving access configuration information returned by the base station according to the second capability information, in which the access configuration information is configured to configure the terminal to subsequently access the base station through the designated access manner.

In summary, with the solution shown in the embodiments of the present disclosure, when the terminal has the capability to support unlicensed frequency bands based on cellular mobile communication technology, after accessing the base station, the terminal reports the first capability information to the base station. After receiving the first capability information reported by the terminal, the base station may learn that the terminal has the capability to support unlicensed frequency bands based on cellular mobile communication technology, and then performing resource scheduling on the terminal based on the first capability information, so that the base station can know the terminal's capability of supporting the unlicensed frequency bands, and then perform resource scheduling based on the terminal's capability of supporting the unlicensed frequency bands and perform data transmission with the terminal.

In addition, with the solution shown in the embodiment of the present disclosure, before accessing the base station, the terminal may obtain base station capability information sent by the base station through the broadcast channel, or, when accessing the base station before, the base station capability information is sent by the base station through unicast, and when the base station capability information indicates that the base station has the capability to support unlicensed frequency bands based on cellular mobile communication technology, the base station is accessed, so that the terminal can know whether the base station has the capability to support unlicensed frequency bands, and then may select whether to access the base station according to whether the base station has the capability to support the unlicensed frequency bands.

In addition, in the solution shown in the embodiments of the present disclosure, when the terminal has support for unlicensed frequency bands based on cellular mobile communication technology, after accessing the base station, the terminal also sends second capability information to the base station to notify the base station that the terminal has capability to support a designated access manner. After receiving the second capability information, the base station returns access configuration information to the terminal to instruct the terminal to subsequently access the base station through the designated access manner, thereby realizing a configuration of the access manner that support unlicensed frequency bands between the base station and the terminal.

Figure 4:
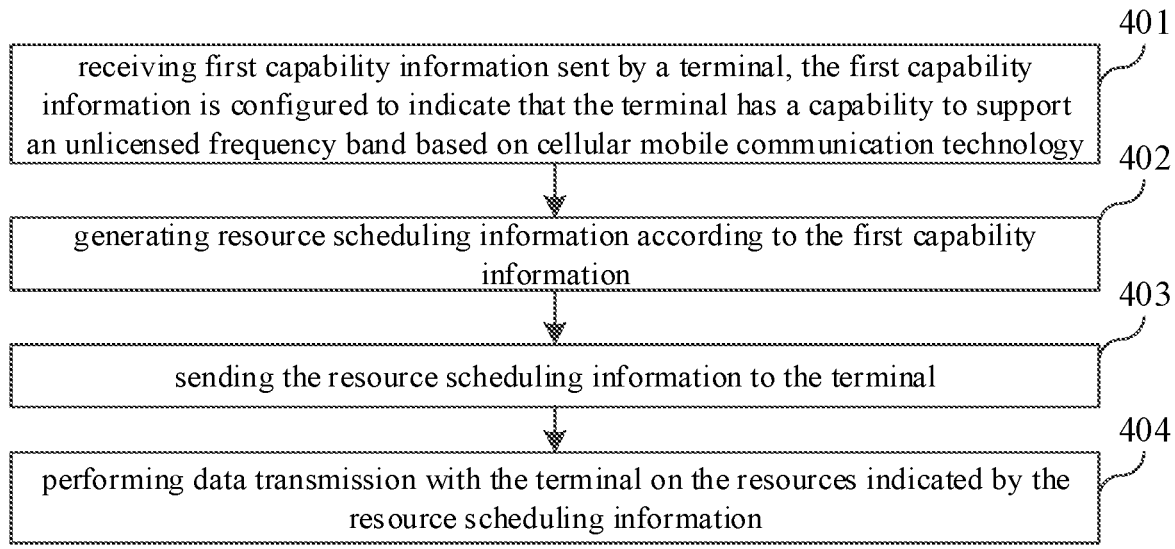
FIG. 4 is a flowchart showing a data transmission method according to an exemplary embodiment.

FIG. 4 is a flowchart showing a data transmission method according to an exemplary embodiment. As shown in FIG. 4, the data transmission method is applied to the wireless communication system shown in FIG. 1, and is executed by the base station 120 in FIG. 1. The method may include the following steps.

In step 401, first capability information sent by a terminal is received, in which the first capability information is configured to indicate that the terminal has a capability to support an unlicensed frequency band based on cellular mobile communication technology.

In step 402, resource scheduling information is generated according to the first capability information, in which the resource scheduling information is configured to schedule resources for data transmission between the terminal and the base station.

In step 403, the resource scheduling information is sent to the terminal.

In step 404, data transmission is performed with the terminal on the resources indicated by the resource scheduling information.

Optionally, generating resource scheduling information according to the first capability information includes: determining a frequency band available to the terminal according to the first capability information, in which the frequency band available to the terminal includes all or part of the unlicensed frequency band supported by the terminal; allocating resources used for data transmission to the terminal on the frequency band available to the terminal; generating the resource scheduling information according to the allocated resources.

Optionally, before receiving the first capability information sent by the terminal, the method also includes: sending base station capability information to the terminal in a broadcast manner, in which the base station capability information is configured to indicate whether the base station has a capability to support an unlicensed frequency band based on the cellular mobile communication technology.

Optionally, sending the base station capability information to the terminal in the broadcast manner may include: sending a system message in the broadcast manner, in which the base station capability information is carried in a master information block (MIB) or a system information block (SIB) in the system message.

Optionally, the method further includes: sending base station capability information to the terminal through a unicast radio resource control (RRC) signaling, in which the base station capability information is configured to indicate whether the base station has a capability to support the unlicensed frequency band based on the cellular mobile communication technology.

Optionally, the method further includes: receiving second capability information sent by the terminal, in which the second capability information is configured to indicate that the terminal has a capability to support a designated access manner, and the designated access manner is a network access manner based on an unlicensed frequency band; returning access configuration information to the terminal according to the second capability information, in which the access configuration information is configured to configure the terminal to subsequently access the base station through the designated access manner.

In summary, with the solution shown in the embodiments of the present disclosure, when the terminal has the capability to support unlicensed frequency bands based on cellular mobile communication technology, after accessing the base station, the terminal reports the first capability information to the base station. After receiving the first capability information reported by the terminal, the base station may learn that the terminal has the capability to support unlicensed frequency bands based on cellular mobile communication technology, and then performing resource scheduling on the terminal based on the first capability information, so that the base station can know the terminal's capability of supporting the unlicensed frequency bands, and then perform resource scheduling based on the terminal's capability of supporting the unlicensed frequency bands and perform data transmission with the terminal.

In addition, with the solution shown in the embodiment of the present disclosure, before accessing the base station, the terminal may obtain base station capability information sent by the base station through the broadcast channel, or, when accessing the base station before, the base station capability information is sent by the base station through unicast, and when the base station capability information indicates that the base station has the capability to support unlicensed frequency bands based on cellular mobile communication technology, the base station is accessed, so that the terminal can know whether the base station has the capability to support unlicensed frequency bands, and then may select whether to access the base station according to whether the base station has the capability to support the unlicensed frequency bands.

In addition, in the solution shown in the embodiment of the present disclosure, when the terminal has capability to support the unlicensed frequency bands based on cellular mobile communication technology, after accessing the base station, the terminal also sends second capability information to the base station to notify the base station that the terminal has capability to support a designated access manner. After receiving the second capability information, the base station returns access configuration information to the terminal to instruct the terminal to subsequently access the base station through the designated access manner, thereby realizing a configuration of the access manner that support unlicensed frequency bands between the base station and the terminal.

Figure 5:
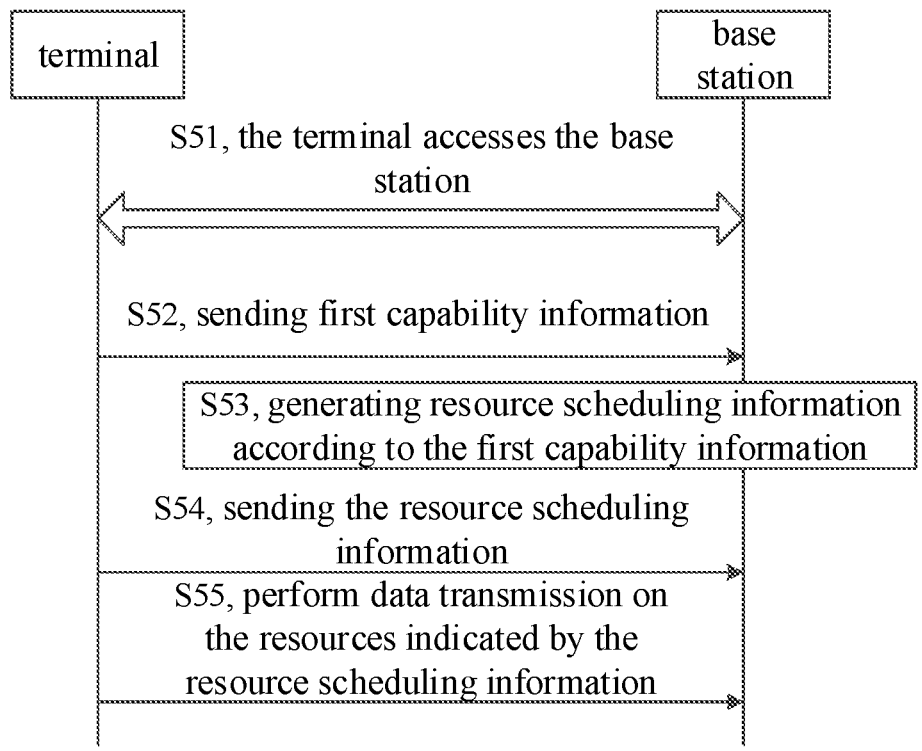
FIG. 5 is a flowchart showing a data transmission method according to an exemplary embodiment.

FIG. 5 is a flowchart showing a data transmission method according to an exemplary embodiment. As shown in FIG. 5, the data transmission method is applied to the wireless communication system shown in FIG. 1, and the method may include the following steps.

In step S51, the terminal accesses the base station.

In the embodiments of the present disclosure, the terminal can access the base station based on cellular mobile communication technology. For example, after detecting the synchronization signal sent by the base station and synchronizes with the base station, the terminal initiates a random access process to the base station. For example, the terminal initiates a contention-based random access process to the base station, or the terminal initiates a non-contention-based random access process to the base station.

Optionally, the terminal may obtain base station capability information of the base station before accessing the base station. The base station capability information is configured to indicate whether the base station has the capability to support unlicensed frequency bands based on cellular mobile communication technology. When the base station has the capability to support unlicensed frequency bands based on cellular mobile communication technology, the terminal accesses the base station.

In a possible implementation, when the terminal only supports unlicensed frequency bands based on cellular mobile communication technology, the terminal needs to access a base station that also has the capability to support unlicensed frequency bands based on cellular mobile communication technology, and may not be able to access a base station which does not have the capability to support the unlicensed frequency bands based on cellular mobile communication technology. Before accessing the base station, the terminal needs to obtain the base station capability information of the base station to determine whether the base station to be accessed has the capability of supporting unlicensed frequency bands based on cellular mobile communication technology, if yes, the terminal may initiate an access procedure to the base station, otherwise, the terminal will not initiate an access procedure to the base station.

For example, taking the above-mentioned cellular mobile communication technology as 5G NR technology as an example, the capability to support unlicensed frequency bands based on NR technology can be referred to as NR-U capability. When a terminal only has NR-U capability, but not ordinary NR capability, the terminal may only be able to access base stations with NR-U capability. Therefore, when a terminal that only supports NR-U capability performs network access, it can obtain the base station capability information of the surrounding base stations, and select the base station with NR-U capability for access. Optionally, when there are multiple base stations around NR-U capable base stations, a terminal that only supports NR-U capability can choose one of the base stations to initiate accessing based on other factors (such as signal quality, service types supported by the base station, etc.).

Alternatively, in another possible implementation manner, when the terminal supports both unlicensed frequency bands and licensed frequency bands based on cellular mobile communication technology, the terminal can preferentially choose to access to a base station which simultaneously supports both unlicensed frequency bands and support licensed frequency bands based on cellular mobile communication technology.

For example, in addition to indicating whether the base station has the capability to support unlicensed frequency bands based on cellular mobile communication technology, the base station capability information of a base station may also indicate whether the base station has the capability to support licensed frequency bands based on cellular mobile communication technology. When the terminal supports both unlicensed frequency bands and licensed frequency bands based on cellular mobile communication technology, the terminal is pre-configured with access priority. For example, the base station that supports both unlicensed frequency bands and licensed frequency bands based on cellular mobile communication technology has the first priority, the base station which only supports the licensed frequency bands based on cellular mobile communication technology has the second priority, while the base station which only supports the unlicensed frequency bands based on cellular mobile communication technology has the third priority. When the terminal needs to access the base station, the base station capability information of the respective surrounding base stations may be obtained firstly, and the base stations that support both unlicensed frequency bands and licensed frequency bands based on cellular mobile communication technology may be preferentially selected for access. When there is no base station that supports both unlicensed frequency bands and licensed frequency bands based on cellular mobile communication technology, or, when access to a base station that supports both unlicensed frequency bands and licensed frequency bands based on cellular mobile communication technology fails, the terminal selects the base station that only supports licensed frequency bands based on cellular mobile communication technology for access; when there is no base station that only supports licensed frequency bands based on the cellular mobile communication technology, or when access to the base station that only supports licensed frequency bands based on the cellular mobile communication technology fails, the terminal selects base stations that only support unlicensed frequency bands based on cellular mobile communication technology to initiate access.

For example, taking the above-mentioned cellular mobile communication technology as 5G NR technology as an example, the capability to support unlicensed frequency bands based on NR technology may be called NR-U capability, and the capability to support licensed frequency bands based on NR technology may be called NR capability. When a terminal with both NR-U capability and NR capability performs network access, it can obtain base station capability information of surrounding base stations, and select base stations for access according to preset priorities. For example, a terminal with both NR-U capability and NR capability detects three surrounding base stations (base station 1, base station 2, and base station 3), and obtains the base station capability information of each of the three base stations. The base station 1 has both NR-U capability and NR capability, the base station 2 only has NR capability, and the base station 3 only has NR-U capability. When accessing the network, the terminal first selects base station 1 for network access. If the access to base station 1 fails, the base station 2 may be selected for network access. If the access to base station 2 also fails, then the terminal initiates network access to base station 3.

In a possible implementation manner, the base station may send base station capability information to the terminal in a broadcast manner, so that the terminal may choose whether to access the base station according to the base station capability information of the base station. Correspondingly, when acquiring the base station capability information of the base station, the terminal can receive the base station capability information sent by the base station in a broadcast manner.

In the embodiments of the present disclosure, the base station may send a system message by broadcasting. The master information block (MIB) or the system information block (SIB) in the system message carries the base station capability information; correspondingly, when receiving the base station capability information sent by the base station in broadcasting, the terminal may receive the system message broadcast by the base station, and obtain the base station capability information carried in the master information block (MIB) or the system information block (SIB) in the system message.

In another possible implementation manner, the terminal may obtain locally stored capability information of the base station; the capability information of the base station is sent by the base station through unicast radio resource control (RRC) signaling when the terminal previously accessed the base station.

For example, when the terminal supports both unlicensed frequency bands and licensed frequency bands based on cellular mobile communication technology, the terminal does not know whether the base station supports unlicensed frequency bands based on cellular mobile communication technology before accessing the base station for the first time, but knows that the base station supports the licensed frequency band based on cellular mobile communication technology. At this time, the terminal can access the base station, and then receive the base station capability information sent by the base station through RRC signaling, and store the base station capability information sent by the base station locally. In a case of detecting this base station again in the subsequent access process, the base station capability information of the base station can be obtained locally.

Optionally, each time the terminal accesses the base station, the base station sends base station capability information to the terminal through RRC signaling. After the terminal receives the base station capability information sent by the base station through RRC signaling, if the base station capability information of the base station has not been stored locally, the base station capability information of the base station is directly stored, and if the base station capability information of the base station is already stored locally, the locally stored base station capability information of the base station is updated.

In step S52, the terminal sends first capability information to the base station, and the base station receives the first capability information; the first capability information is configured to indicate that the terminal has a capability to support an unlicensed frequency band based on cellular mobile communication technology.

In the embodiment of the present disclosure, the terminal reports the first capability information through the terminal capability reporting process. For example, the base station may send a capability inquiry request to the terminal. After receiving the capability inquiry request, the terminal returns a terminal capability response to the base station. The terminal capability response includes the first capability information.

For example, after the terminal accesses the base station, the base station sends the terminal capability inquiry UECapabilityEnquiry signaling to the terminal. After receiving the UECapability Enquiry signaling, the terminal can return terminal capability information UECapabilityInformation signaling to the base station, and the UECapabilityInformation signaling carries the above-mentioned first capability information.

In step S53, the base station generates resource scheduling information according to the first capability information, and the resource scheduling information is configured to schedule resources for data transmission between the terminal and the base station.

In the embodiments of the present disclosure, the base station can perform resource configuration and scheduling configuration for the terminal according to the terminal's capability to support unlicensed spectrum based on cellular mobile communication technology and its own capability to support unlicensed spectrum based on cellular mobile communication technology.

For example, when generating resource scheduling information according to the first capability information, the base station may determine the frequency bands available to the terminal according to the first capability information, and the frequency bands available to the terminal include all or part of the frequency bands of the unlicensed frequency bands supported by the terminal based on cellular mobile communication technology. Resources used for data transmission are allocated to the terminal on the frequency band available to the terminal; the resource scheduling information is generated according to the allocated resources.

In the embodiment of the present disclosure, after the base station receives the first capability information sent by the terminal and determines that the terminal supports unlicensed frequency bands based on cellular mobile communication technology, it can first configure the frequency domain resources available to the terminal, that is, resources on which frequency bands can be used by the terminal. When the subsequent data transmission scheduling is performed, the time-frequency resources used for data transmission may be scheduled for the terminal from the frequency domain resources available to the terminal.

For example, when the terminal only supports unlicensed frequency bands based on cellular mobile communication technology, the available frequency bands configured for the terminal by the base station may only include the unlicensed frequency bands; when the base station perform resource scheduling for data transmission for the terminal subsequently, only time-frequency resources on the unlicensed frequency band are scheduled for the terminal. When the terminal also supports licensed frequency bands based on cellular mobile communication technology, the available frequency bands configured for the terminal by the base station may include the unlicensed frequency bands and the licensed frequency bands; when the base station perform resource scheduling for data transmission for the terminal subsequently, not only the time-frequency resources on the unlicensed frequency band are scheduled for the terminal, but also the time-frequency resources on the licensed frequency band can be scheduled for the terminal.

In step S54, the base station sends the resource scheduling information to the terminal; the terminal receives the resource scheduling information.

In the embodiments of the present disclosure, the base station may send the resource scheduling information to the terminal through the physical downlink control channel PDCCH, and accordingly, the terminal receives the resource scheduling information sent by the base station through the physical downlink control channel.

In step S55, the terminal and the base station perform data transmission on the resources indicated by the resource scheduling information.

For example, taking the above-mentioned cellular mobile communication technology as 5G NR technology as an example, when the terminal only has NR-U capability, the available frequency bands configured for the terminal by the base station may only include the unlicensed frequency bands; when the base station perform resource scheduling for data transmission for the terminal subsequently, time-frequency resources scheduled for the terminal may only include the time-frequency resources on the unlicensed frequency band. That is, data transmission between the terminal and the base station is only performed on the unlicensed frequency band.

When the terminal has both NR-U capability and NR capability, the available frequency bands configured for the terminal by the base station may include the unlicensed frequency bands and the licensed frequency bands; when the base station perform resource scheduling for data transmission for the terminal subsequently, time-frequency resources scheduled for the terminal may include the time-frequency resources on the unlicensed frequency band and the time-frequency resources on the licensed frequency band. That is, the terminal and the base station can perform data transmission on the unlicensed frequency band or on the licensed frequency band. Alternatively, data transmission is performed on the unlicensed frequency band and the licensed frequency band at the same time.

For example, for an NR UE that supports NR-U capability at the same time, when the UE needs a high transmission rate, a base station that supports both NR-U capability and NR capability can allocate unlicensed frequency band resources to the UE to improve the UE's transmission rate.

For example, in a possible application scenario, a UE needs a rate of 10 Gbps to support its real-time video and file download service, then the base station can transmit the file download service to the UE using NR-U (time-frequency resources on the data unlicensed frequency band are allocated to data corresponding to the file download service), and the real-time video service is transmitted to the UE through the licensed frequency band (the time-frequency resources on the licensed frequency band are allocated to the data corresponding to the real-time video service). Alternatively, in another possible implementation manner, the base station may also use NR-U to transmit the real-time video service to the UE, and transmit the file download service from the licensed frequency band to the UE.

Optionally, after the terminal accesses the base station, it may also send second capability information to the base station, and the base station receives the second capability information. The second capability information is configured to indicate that the terminal has a capability to support a designated access manner, and the designated access manner is a network access manner based on an unlicensed frequency band. After receiving the second capability information, the base station may return access configuration information to the terminal. The access configuration information is configured to configure the terminal to subsequently access the base station through the designated access manner. The terminal receives the access configuration information. When network access is performed again, the base station can be accessed through the above-mentioned designated access manner according to the access configuration information.

The above-mentioned designated access manner may be an access technology that can be used by a terminal that supports an unlicensed frequency band based on cellular mobile communication technology. For example, the above-mentioned designated access manner may include, but is not limited to, two-step random access.

For example, taking the above-mentioned cellular mobile communication technology as 5G NR technology as an example, after a terminal with NR-U capability accesses the base station, it reports to the base station that it has the capability of two-step random access, and the base station obtains that the terminal has two-step random access. After the capability is enabled, the terminal can be notified of the configuration required for two-step random access. When the terminal accesses next time, it can use the two-step random access manner to access the base station according to the configuration notified by the base station.

In summary, with the solution shown in the embodiments of the present disclosure, when the terminal has the capability to support unlicensed frequency bands based on cellular mobile communication technology, after accessing the base station, the terminal reports the first capability information to the base station. After receiving the first capability information reported by the terminal, the base station may learn that the terminal has the capability to support unlicensed frequency bands based on cellular mobile communication technology, and then performing resource scheduling on the terminal based on the first capability information, so that the base station can know the terminal's capability of supporting the unlicensed frequency bands, and then perform resource scheduling based on the terminal's capability of supporting the unlicensed frequency bands and perform data transmission with the terminal.

In addition, with the solution shown in the embodiment of the present disclosure, before accessing the base station, the terminal may obtain base station capability information sent by the base station through the broadcast channel, or, when accessing the base station before, the base station capability information is sent by the base station through unicast, and when the base station capability information indicates that the base station has the capability to support unlicensed frequency bands based on cellular mobile communication technology, the base station is accessed, so that the terminal can know whether the base station has the capability to support unlicensed frequency bands, and then may select whether to access the base station according to whether the base station has the capability to support the unlicensed frequency bands.

In addition, in the solution shown in the embodiments of the present disclosure, when the terminal has support for unlicensed frequency bands based on cellular mobile communication technology, after accessing the base station, the terminal also sends second capability information to the base station to notify the base station that the terminal has capability to support a designated access manner. After receiving the second capability information, the base station returns access configuration information to the terminal to instruct the terminal to subsequently access the base station through the designated access manner, thereby realizing a configuration of the access manner that support unlicensed frequency bands between the base station and the terminal.

The following are apparatus embodiments of the present disclosure, which can be configured to implement the method embodiments of the present disclosure. For details that are not disclosed in the device embodiments of the present disclosure, please refer to the method embodiments of the present disclosure.

Figure 6:
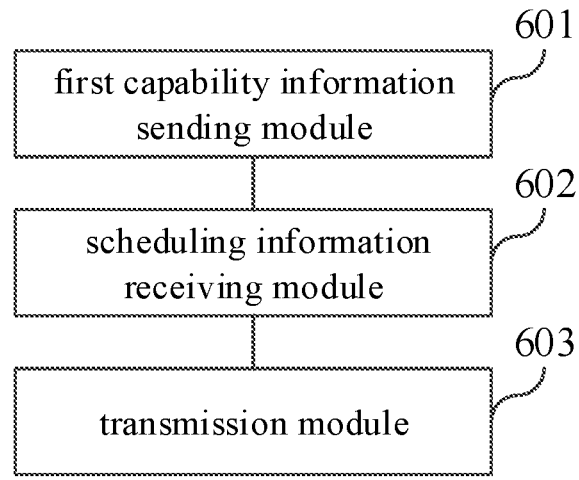
FIG. 6 is a block diagram showing a data transmission apparatus according to an exemplary embodiment.

FIG. 6 is a block diagram showing a data transmission apparatus according to an exemplary embodiment. As shown in FIG. 6, the data transmission apparatus can be implemented as a terminal in the implementation environment shown in FIG. 1 through hardware or a combination of software and hardware. All or part of the steps performed by the terminal in any of the embodiments shown in FIG. 2, FIG. 3, or FIG. 5. The data transmission apparatus may include followings.

A first capability information sending module 601 is configured to send first capability information to a base station, in which the first capability information is configured to indicate that the terminal has a capability to support an unlicensed frequency band based on cellular mobile communication technology.

A scheduling information receiving module 602 is configured to receive resource scheduling information generated and sent by the base station according to the first capability information, in which the resource scheduling information is configured to schedule resources for data transmission between the terminal and the base station.

A transmission module 603 is configured to perform data transmission with the base station on the resources indicated by the resource scheduling information.

Optionally, the apparatus further includes: a base station capability information acquiring module, configured to acquire base station capability information of the base station before sending the first capability information to the base station, in which the base station capability information is configured to indicate whether the base station has a capability to support an unlicensed frequency band based on the cellular mobile communication technology; and an access module, configured to access the base station in response to the base station capability information indicating that the base station has the capability to support the unlicensed frequency band based on the cellular mobile communication technology.

Optionally, the base station capability information acquiring module is configured to: receive base station capability information sent by the base station in a broadcast manner; or, acquire base station capability information stored locally, in which the base station capability information is sent by the base station through a unicast radio resource control (RRC) signaling in response to the terminal previously accessing the base station.

Optionally, when receiving base station capability information sent by the base station in the broadcast manner, the base station capability information acquiring module is configured to: receive a system message broadcasted by the base station; and acquire the base station capability information carried in a master information block (MIB) or a system information block (SIB) in the system message.

Optionally, the apparatus further includes: a base station capability information receiving module, configured to receive base station capability information sent by the base station, in which the base station capability information is configured to indicate whether the base station has a capability to support an unlicensed frequency band based on the cellular mobile communication technology; a storage module is configured to store the base station capability information.

Optionally, the apparatus further includes: a second capability information sending module, configured to send second capability information to the base station, in which the second capability information is configured to indicate that the terminal has a capability to support a designated access manner, and the specified access manner is a network access manner based on an unlicensed frequency band; and an access configuration information receiving module, configured to receive access configuration information returned by the base station according to the second capability information, in which the access configuration information is configured to configure the terminal to subsequently access the base station through the designated access manner.

Figure 7:
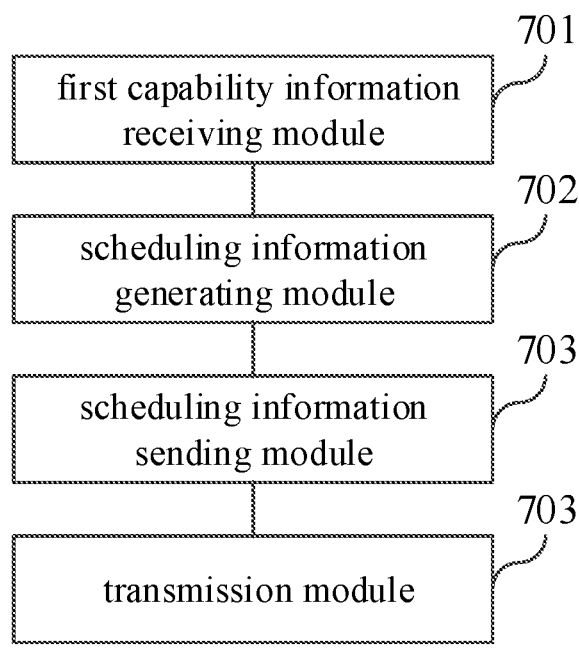
FIG. 7 is a block diagram showing a data transmission apparatus according to an exemplary embodiment.

FIG. 7 is a block diagram showing a data transmission apparatus according to an exemplary embodiment. As shown in FIG. 7, the data transmission apparatus can be implemented as a base station in the implementation environment shown in FIG. 1 through hardware or a combination of software and hardware. All or part of the steps performed by the base station in any of the embodiments shown in FIG. 2, FIG. 4, or FIG. 5.

The data transmission apparatus may include followings.

A first capability information receiving module 701 is configured to receive first capability information sent by a terminal, in which the first capability information is configured to indicate that the terminal has a capability to support an unlicensed frequency band based on cellular mobile communication technology.

A scheduling information generating module 702 is configured to generate resource scheduling information according to the first capability information, in which the resource scheduling information is configured to schedule resources for data transmission between the terminal and the base station.

A scheduling information sending module 703 is configured to send the resource scheduling information to the terminal.

A transmission module 704 is configured to perform data transmission with the terminal on the resources indicated by the resource scheduling information.

Optionally, the scheduling information generating module 702 is specifically configured to: determine a frequency band available to the terminal according to the first capability information, in which the frequency band available to the terminal includes all or part of the unlicensed frequency band supported by the terminal; allocate resources used for data transmission to the terminal on the frequency band available to the terminal; generate the resource scheduling information according to the allocated resources.

Optionally, the apparatus further includes: a broadcast module, configured to send base station capability information to the terminal in a broadcast manner, in which the base station capability information is configured to indicate whether the base station has a capability to support an unlicensed frequency band based on the cellular mobile communication technology.

Optionally, the broadcast module is specifically configured to send a system message in the broadcast manner, in which the base station capability information is carried in a master information block (MIB) or a system information block (SIB) in the system message.

Optionally, the apparatus further includes: a unicast module, configured to send base station capability information to the terminal through a unicast radio resource control (RRC) signaling, in which the base station capability information is configured to indicate whether the base station has a capability to support the unlicensed frequency band based on the cellular mobile communication technology.

Optionally, the apparatus further includes: a second capability information receiving module, configured to receive second capability information sent by the terminal, in which the second capability information is configured to indicate that the terminal has a capability to support a designated access manner, and the designated access manner is a network access manner based on an unlicensed frequency band; and an access configuration information return module, configured to return access configuration information to the terminal according to the second capability information, in which the access configuration information is configured to configure the terminal to subsequently access the base station through the designated access manner.

An exemplary embodiment of the present disclosure also provides a data transmission system. The system includes a terminal and a base station.

The terminal includes the data transmission apparatus provided in the embodiment shown in FIG. 6.

The base station includes the data transmission apparatus provided in the embodiment shown in FIG. 7.

It should be noted that, when the apparatus provided in the above embodiment realizes its functions, only the division of the above-mentioned functional modules is used as an example for illustration. In actual applications, the above-mentioned functions can be allocated by different functional modules according to actual needs. That is, the content structure of the device is divided into different functional modules to complete all or part of the functions described above.

Regarding the apparatus in the foregoing embodiment, the specific manner in which each module performs operations has been described in detail in the embodiment of the method, and will not be elaborated here.

An exemplary embodiment of the present disclosure provides a data transmission apparatus that can implement all or part of the steps executed by a terminal in the above-mentioned embodiment shown in FIG. 2, FIG. 3, or FIG. 5 of the present disclosure. The data transmission apparatus includes: a processor; and a memory configured to store instructions executable by the processor; in which the processor is configured to: send first capability information to a base station, in which the first capability information is configured to indicate that the terminal has a capability to support an unlicensed frequency band based on cellular mobile communication technology; receive resource scheduling information generated and sent by the base station according to the first capability information, in which the resource scheduling information is configured to schedule resources for data transmission between the terminal and the base station; and perform data transmission with the base station on the resources indicated by the resource scheduling information.

An exemplary embodiment of the present disclosure provides a data transmission apparatus that can implement all or part of the steps performed by a base station in the embodiment shown in FIG. 2, FIG. 4, or FIG. 5 of the present disclosure. The data transmission apparatus includes: a processor; and a memory configured to store instructions executable by the processor; in which the processor is configured to: receive first capability information sent by a terminal, in which the first capability information is configured to indicate that the terminal has a capability to support an unlicensed frequency band based on cellular mobile communication technology; generate resource scheduling information according to the first capability information, in which the resource scheduling information is configured to schedule resources for data transmission between the terminal and the base station; send the resource scheduling information to the terminal; and perform data transmission with the terminal on the resources indicated by the resource scheduling information.

The foregoing mainly takes terminals and base stations as examples to introduce the solutions provided by the embodiments of the present disclosure. It can be understood that, in order to implement the above-mentioned functions, the terminal and the base station include hardware structures and/or software modules corresponding to each function. In combination with the modules and algorithm steps of the examples described in the embodiments disclosed in the present disclosure, the embodiments of the present disclosure can be implemented in the form of hardware or a combination of hardware and computer software. Whether a certain function is executed by hardware or computer software-driven hardware depends on the specific application and design constraint conditions of the technical solution. Those skilled in the art can use different methods for each specific application to implement the described functions, but such implementation should not be considered as going beyond the scope of the technical solutions of the embodiments of the present disclosure.

Figure 8:
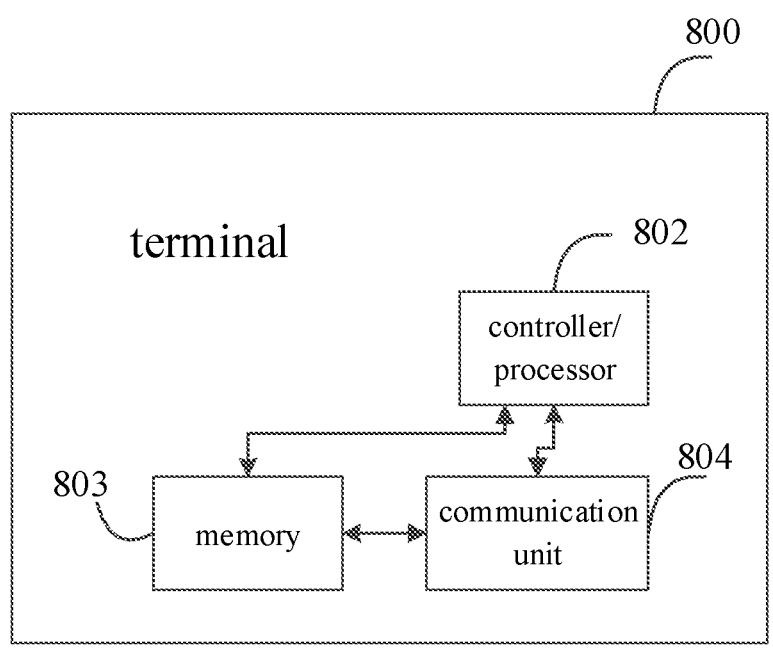
FIG. 8 is a schematic structural diagram of a data transmission apparatus according to an exemplary embodiment.

FIG. 8 is a schematic structural diagram of a data transmission apparatus according to an exemplary embodiment. The apparatus 800 may be implemented as a terminal or a base station in each of the foregoing embodiments.

The apparatus 800 includes a communication unit 804 and a processor 802. The processor 802 may also be a controller, which is represented as "controller/processor 802" in FIG. 8. The communication unit 804 is configured to support the terminal to communicate with other network devices (for example, base stations, etc.).

Further, the apparatus 800 may further include a memory 803, and the memory 803 is configured to store program codes and data of the apparatus 800.

It can be understood that FIG. 8 only shows a simplified design of the apparatus 800. In practical applications, the apparatus 800 may include any number of processors, controllers, memories, communication units, etc., and all terminals or base stations that can implement the embodiments of the present disclosure are within the protection scope of the embodiments of the present disclosure.

Those skilled in the art should be aware that, in one or more of the foregoing examples, the functions described in the embodiments of the present disclosure may be implemented by hardware, software, firmware, or any combination thereof. When implemented by software, these functions can be stored in a computer-readable medium or transmitted as one or more instructions or codes on the computer-readable medium. The computer-readable medium includes a computer storage medium and a communication medium, where the communication medium includes any medium that facilitates the transfer of a computer program from one place to another. The storage medium may be any available medium that can be accessed by a general-purpose or special-purpose computer.

The embodiment of the present disclosure also provides a computer storage medium for storing computer software instructions used by the above-mentioned terminal or base station, which contains a program designed for executing the above-mentioned data transmission method.

The skilled artisan will easily think of other embodiments of the present disclosure after considering the description and practicing the art disclosed herein. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the disclosure being indicated by the following claims.

It is to be understood that the present disclosure is not limited to the precise structure described above and shown in the drawings, and various modifications and changes can be made without departing from its scope. The scope of the present disclosure is only limited by the appended claims.

What is claimed is:

1. A data transmission method, executed by a terminal and comprising:
    acquiring base station capability information of a base station, wherein the base station capability information is configured to indicate whether the base station has a capability to support an unlicensed frequency band based on cellular mobile communication technology;
    accessing the base station in response to the base station capability information indicating that the base station has the capability to support the unlicensed frequency band based on the cellular mobile communication technology;
    sending first capability information to the base station, wherein the first capability information is configured to indicate that the terminal has a capability to support an unlicensed frequency band based on the cellular mobile communication technology;
    receiving resource scheduling information generated and sent by the base station according to the first capability information, wherein the resource scheduling information is configured to schedule resources for data transmission between the terminal and the base station;
    sending second capability information to the base station, wherein the second capability information is configured to indicate that the terminal has a capability to support a designated access manner, and the designated access manner is a network access manner based on an unlicensed frequency band;
    receiving access configuration information returned by the base station according to the second capability information, wherein the access configuration information is configured to configure the terminal to subsequently access the base station through the designated access manner; and
    performing data transmission with the base station on the resources indicated by the resource scheduling information.

2. The method according to claim 1, wherein acquiring base station capability information of the base station comprises at least one of:
    receiving base station capability information sent by the base station in a broadcast manner;
    or,
    acquiring base station capability information stored locally, wherein the base station capability information is sent by the base station through a unicast radio resource control (RRC) signaling in response to the terminal previously accessing the base station.

3. The method according to claim 2, wherein receiving base station capability information sent by the base station in the broadcast manner comprises:
receiving a system message broadcasted by the base station;
acquiring the base station capability information carried in a master information block (MIB) or a system information block (SIB) in the system message.

4. The method according to claim 1, further comprising:
receiving the base station capability information sent by the base station;
storing the base station capability information.

5. A data transmission method, executed by a base station and comprising:
sending base station capability information to a terminal, wherein the base station capability information is configured to indicate whether the base station has a capability to support an unlicensed frequency band based on cellular mobile communication technology;
receiving first capability information sent by the terminal, wherein the first capability information is configured to indicate that the terminal has a capability to support an unlicensed frequency band based on the cellular mobile communication technology;
generating resource scheduling information according to the first capability information, wherein the resource scheduling information is configured to schedule resources for data transmission between the terminal and the base station;
sending the resource scheduling information to the terminal;
receiving second capability information sent by the terminal, wherein the second capability information is configured to indicate that the terminal has a capability to support a designated access manner, and the designated access manner is a network access manner based on an unlicensed frequency band;
returning access configuration information to the terminal according to the second capability information, wherein the access configuration information is configured to configure the terminal to subsequently access the base station through the designated access manner; and
performing data transmission with the terminal on the resources indicated by the resource scheduling information.

6. The method according to claim 5, wherein generating resource scheduling information according to the first capability information comprises:
determining a frequency band available to the terminal according to the first capability information, wherein the frequency band available to the terminal comprises all or part of the unlicensed frequency band supported by the terminal;
allocating resources used for data transmission to the terminal on the frequency band available to the terminal;
generating the resource scheduling information according to the allocated resources.

7. The method according to claim 5, wherein sending the base station capability information to the terminal comprises:
sending the base station capability information to the terminal in a broadcast manner.

8. The method according to claim 7, wherein sending the base station capability information to the terminal in the broadcast manner comprises:
sending a system message in the broadcast manner, wherein the base station capability information is carried in a master information block (MIB) or a system information block (SIB) in the system message.

9. The method according to claim 5, wherein sending the base station capability information to the terminal comprises:
sending the base station capability information to the terminal through a unicast radio resource control (RRC) signaling.

10. A terminal comprising:
a processor; and
a memory configured to store instructions executable by the processor;
wherein the processor is configured to:
acquire base station capability information of a base station, wherein the base station capability information is configured to indicate whether the base station has a capability to support an unlicensed frequency band based on cellular mobile communication technology;
access the base station in response to the base station capability information indicating that the base station has the capability to support the unlicensed frequency band based on the cellular mobile communication technology;
send first capability information to the base station, wherein the first capability information is configured to indicate that the terminal has a capability to support an unlicensed frequency band based on the cellular mobile communication technology;
receive resource scheduling information generated and sent by the base station according to the first capability information, wherein the resource scheduling information is configured to schedule resources for data transmission between the terminal and the base station;
send second capability information to the base station, wherein the second capability information is configured to indicate that the terminal has a capability to support a designated access manner, and the designated access manner is a network access manner based on an unlicensed frequency band;
receive access configuration information returned by the base station according to the second capability information, wherein the access configuration information is configured to configure the terminal to subsequently access the base station through the designated access manner; and
perform data transmission with the base station on the resources indicated by the resource scheduling information.

11. The terminal according to claim 10, wherein the processor is configured to perform at least one of:
receiving base station capability information sent by the base station in a broadcast manner;
or,
acquiring base station capability information stored locally, wherein the base station capability information is sent by the base station through a unicast radio resource control (RRC) signaling in response to the terminal previously accessing the base station.

12. The terminal according to claim 11, wherein when receiving base station capability information sent by the base station in the broadcast manner, the processor is configured to:

receive a system message broadcasted by the base station;

acquire the base station capability information carried in a master information block (MIB) or a system information block (SIB) in the system message.

13. The terminal according to claim 10, wherein the processor is configured to:

receive the base station capability information sent by the base station;

store the base station capability information.

14. A base station comprising:

a processor; and a memory configured to store instructions executable by the processor;

wherein the processor is configured to execute the steps of claim 5.

15. A non-transitory computer-readable storage medium having executable instructions, wherein a processor in a terminal invokes the executable instructions to implement the data transmission method according to claim 1.

16. A non-transitory computer-readable storage medium having executable instructions, wherein a processor in a base station invokes the executable instructions to implement the data transmission method according to claim 5.

* * * * *